United States Patent [19]

Russell

[11] Patent Number: 4,766,778

[45] Date of Patent: Aug. 30, 1988

[54] INEXPENSIVE VARIABLE TORQUE TRANSMISSION WITH OVERDRIVE AND METHOD

[76] Inventor: Carl D. Russell, P.O. Box 334, Sallisaw, Okla. 74955

[21] Appl. No.: 682,664

[22] Filed: Dec. 17, 1984

[51] Int. Cl.$^4$ .................. F16H 47/04; F16H 47/08; F16H 47/00

[52] U.S. Cl. ......................... 74/687; 74/677; 74/730; 74/731; 74/732; 192/58 R; 192/58 A

[58] Field of Search ............. 74/740, 745, 687, 677, 74/730, 731, 732, 733, 752 C, 768, 769, 788, 787, 786, 785, 645, 655, 688; 192/58 R, 58 A, 59, 60, 61

[56] References Cited

U.S. PATENT DOCUMENTS

| | | | |
|---|---|---|---|
| 2,135,908 | 11/1938 | Millican | 74/787 |
| 2,350,416 | 6/1944 | Perry | 74/677 |
| 2,388,062 | 10/1945 | Keller | 74/677 |
| 2,543,878 | 3/1951 | Stewart | 192/58 A X |
| 2,775,144 | 12/1956 | Kelbel | 74/769 |
| 2,896,478 | 7/1959 | Winchell | 74/752 C X |
| 3,016,769 | 1/1962 | Christenson et al. | 74/732 |
| 3,130,607 | 4/1964 | Kraemer | 74/677 X |
| 3,147,635 | 9/1964 | Weinrich et al. | 74/752 C X |
| 3,184,021 | 5/1965 | Alleman | 192/58 R |
| 3,208,570 | 9/1965 | Aschauer | 192/58 R |
| 3,298,498 | 1/1967 | Brand | 192/58 R |
| 4,214,652 | 7/1980 | Quenneville | 192/61 X |
| 4,287,792 | 9/1981 | Dailey | 74/752 C X |
| 4,333,555 | 6/1982 | Gogins | 192/58 R |

Primary Examiner—Dirk Wright

[57] ABSTRACT

The invention is a very inexpensive infinite ratio variable transmission which uses a rotatable case type fluid torque pump as the fluid coupled transfer between engine and planetary system. Its rotor is powered by the engine shaft and pumps fluid into a passage through a portion of the casing encompassing and carried by the same power shaft. A fluid system incorporating manual and vacuum controls, restricts the flow of rotor pumped fluid from the casing to cause the casing to rotate, due to retricted fluid flow to power the load and a passage closure secures the engine to the load.

13 Claims, 4 Drawing Sheets

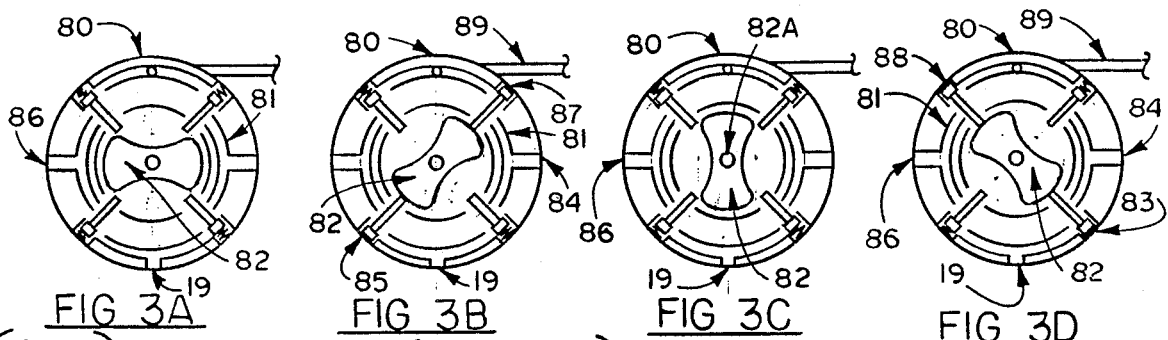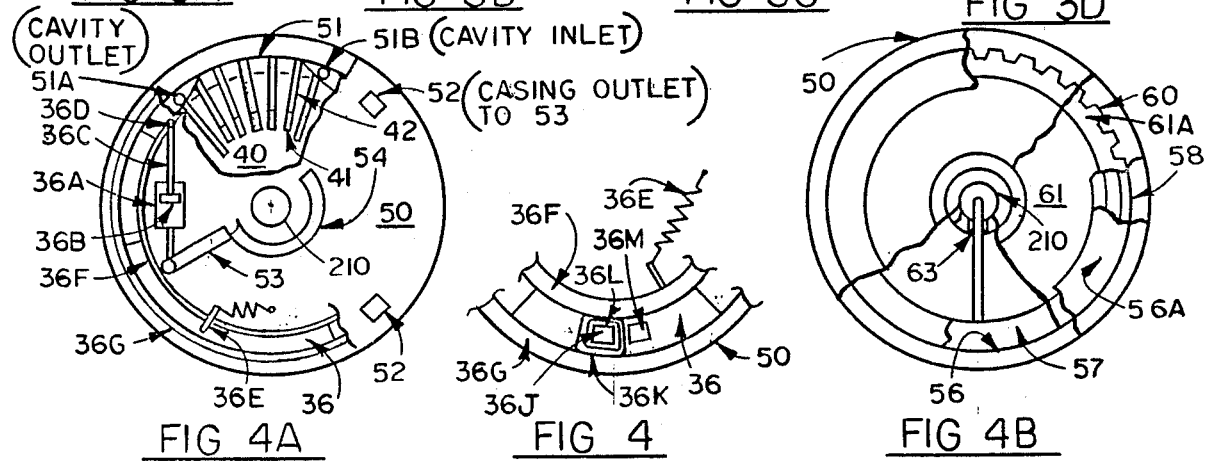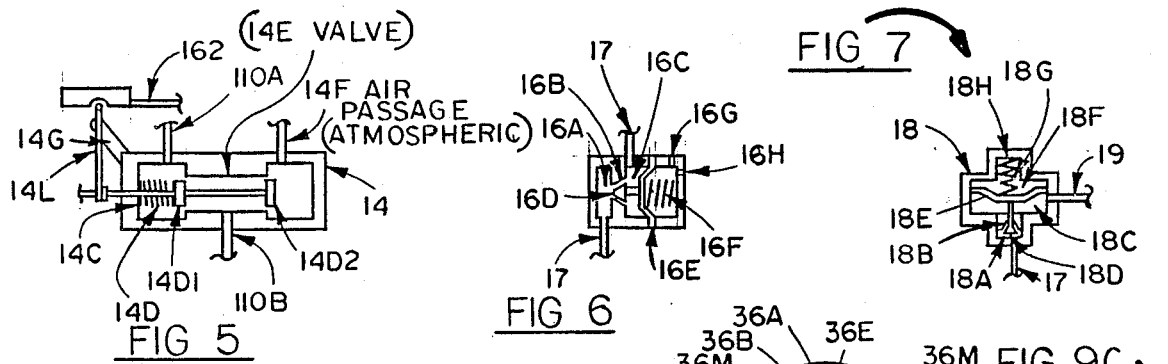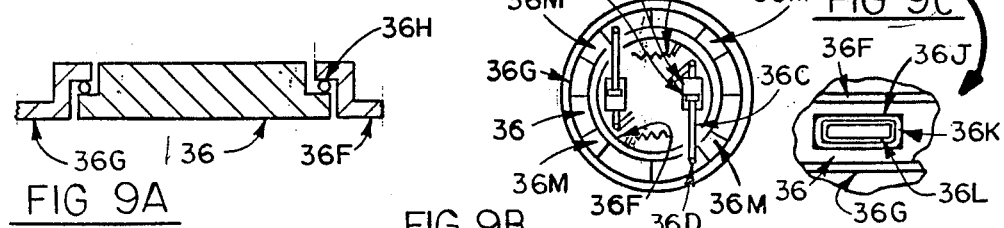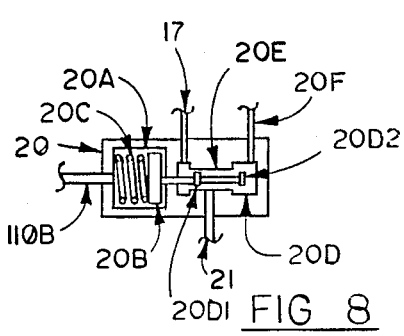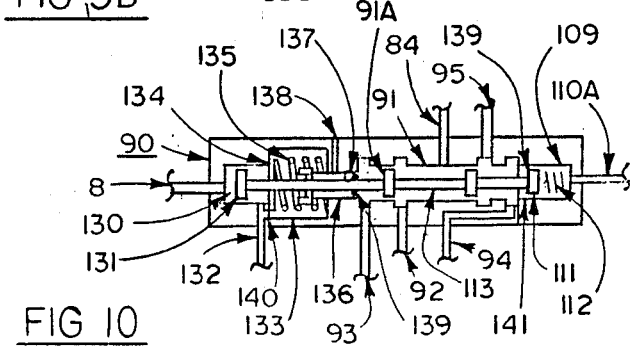

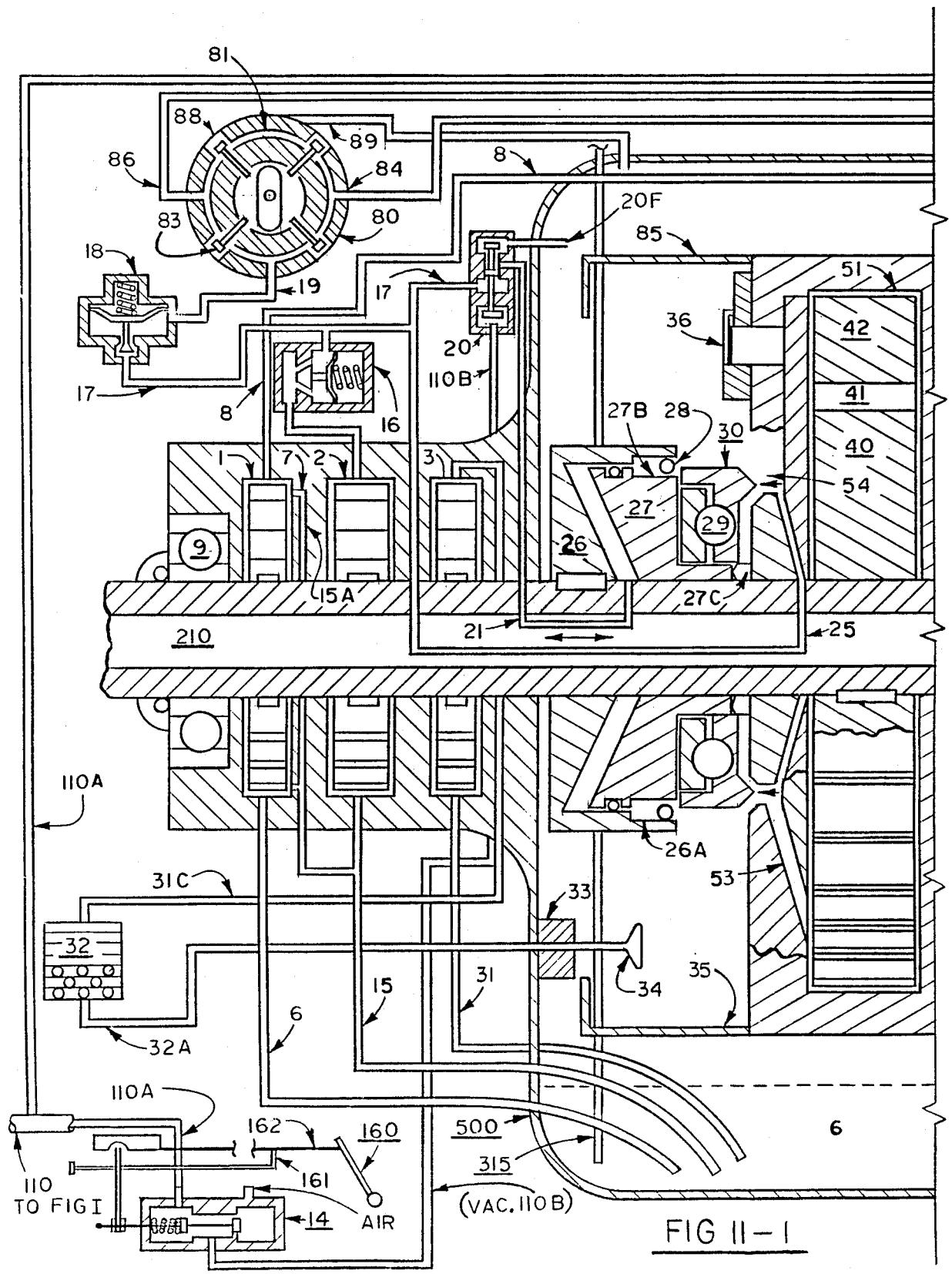

INEXPENSIVE VARIABLE TORQUE TRANSMISSION WITH OVERDRIVE AND METHOD

FIELD OF THE INVENTION

The invention relates broadly to the field of transmissions, and more particularly to a flexible transmission connecting the engine to a load.

BACKGROUND OF THE INVENTION

In present day vehicular transmissions, a fluid drive or a clutch between the engine and the transmission is necessary. This is true because otherwise the bands could burn out as power is always applied to the drive train. However, if a drive train were available, which flexibly coupled the engine to the load, the necessary slip or yield in the drive train could be used to prevent abrupt power changes.

Also, such an arrangement could prevent damage including breakage from the engine through to the load, thereby requiring less maintenance and parts replacement. Elimination of the conventional fluid drive or clutch substantially reduces the cost, number of parts, and weight of the driving train.

Application of such a system to all kinds of engines, provides substantial efficiency increase by reducing the now necessary shifting of gears while affording greater reduction of ratio and increase of torque to the load as needed.

THE PRIOR ART

No prior art is known for inducing directions of movement of rotor blades in pump cavities to provide a flexible, overdrive or engine braking connection to the planetary or gear drive system.

BRIEF SUMMARY OF THE INVENTION

The present invention comprises a variable ratio transmission for connecting a rotating source of power to a rotatable load without requirement of a manual clutch or a fluid drive between the engine and the transmission.

The method is unique in providing a flexible automatic transmission by incorporating engine power shaft, auxiliary pumps and a rotatable casing pump in an arrangement. The rotatable casing pump is carried by the engine power shaft. All impellers are secured to the engine power shaft to form positive pumps, such as blades wiping through casing cavities.

One casing, being rotatable is provided with a biasing valved outlet and an inlet which can be closed to control the pressure within the cavities with a securable arrangement to connect the planetary load, whereby the use of manual and vacuum-controlled valves provide fluids and fluid pressure from an auxiliary pump, which effects the pressure of the fluids inducing resistance to the impeller wiping through the internal cavities of the rotatable casing. The force required for the impeller to wipe the fluid through the cavities is equal to the load. This is provided by the biasing of the fluid to restrict the outlet flow in relation to the force needed in the cavity equal to the force of the impeller less the fluid allowed to escape at the point of biasing. These escaped fluids provide the ratio and the flexibility of the engine to the load.

This transmission will perform all the functions of a conventional automatic transmission including shifting and overdrive as dictated by the load and fueling changes affecting engine vacuum, all without a clutch or fluid drive between the engine and the transmission.

It offers the following advantages:

I. Less expensive—The use of fluid pumps permits fabrication from less costly materials including plastics which can be injection molded or coated metal. Also, the use of molded plastic components eliminates expensive machining and grinding. The valves may also be molded plastic.

II. Maintenance—The manual control components may be checked and replaced independently without disassembly or removal of the transmission. The entire transmission is more readily replaced as it is more compact and of lighter weight.

III. Operates more efficiently—The subject transmission is fully automatic and operates the conventional planetary system. The novel fluid flow biasing control principle to control pressure in cavities allows quieter and smoother operation. The new transmission basically differs in principle because of engine vacuum controlled biasing of the fluid flow effecting cavity pressure torquing ratios for infinite ratio drive of the rotatable casing pump, the connector of the engine to the planetary load.

IV. Greater dependability—The operating principle, the fluid biasing control, eliminates destructive impact of shock and operation on the components while enabling full flexibility in engine-to-load powering connection. Fluid drive pressure is not built up prior to driving engagements, reducing pre-loading of the planetary system. All components are simple and reliable—the pumps may be of the rotary vane blade type and the valves may be molded plastic.

V. Greater range of application—The biasing of fluid in a pump with a rotatable casing carried by the power shaft aided by the planetary system in extending the range of ratio, allows the start-up and handling of much larger loads. Consequently, operation of trucks and earth moving equipment is faciliated by the the availability of inherent low driving ratio. The inlet fluid passage closure reduces the cost of operation by allowing overdrive with fluid pressure of one of the pump's output added to advance the driven connection ahead of the drive, yet allows securing liquid for requiring the driven casing to rotate in unison with the driving rotor, a connection to provide a downhill braking of the load with the engine. These provisions apply equally to diesel-electric railroad engines, requiring much less energy consumption. Even motorcycle drives are vastly improved because the clutch or fluid drive is eliminated. Machine tools benefit from the inherent smooth variable drive coupling. The compactness is ideally suited to front wheel transaxle drive and the minimized vibration extends the range of application. Since the shifting lever and the foot pedal provide the same as conventional automatic transmission, no changes in driving habits are required.

The following is an illustrative view of the invention and the general arrangement of the management by manual, electrical, or manifold pressure as identified by the numbers which will be used throughout the following description:

DESCRIPTION OF PREFERRED EMBODIMENT

Figures 1, 2:
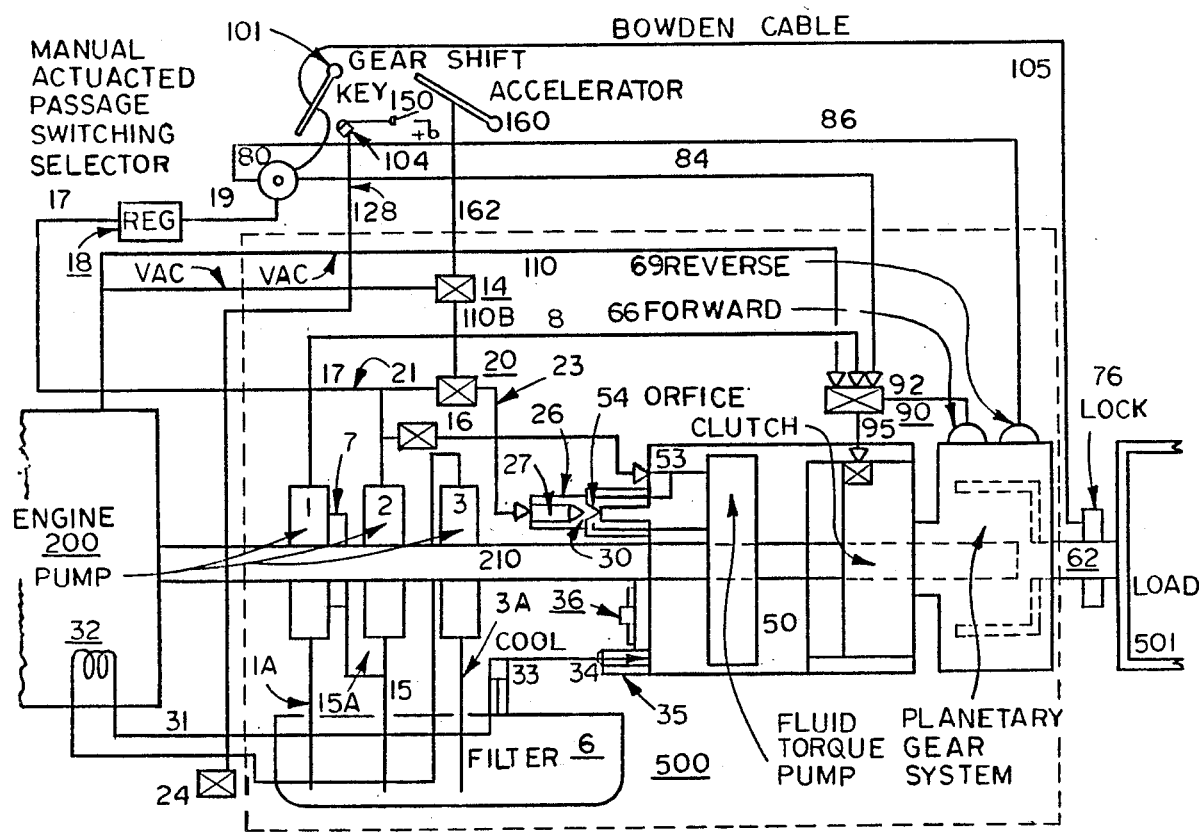

FIG. 1 a schematic view comprising of conduit passage and components of the transmission shows pump 1, fluid passage 1A, pump 2, pump 3, fluid by-pass 3A, fluid reservoir 6, fluid by-pass 7, fluid passage 8, air or vacuum passage selector 14, suction line 15, suction line 15A, pressure inducer 16, fluid passage 17, pressure regulator 18, fluid passage 19, fluid passage selector 20, fluid passage 21, starter switch 24, fluid passage 25, cylinder 26, piston 29, biasing valve 30, fluid passage 31, radiator fluid temperature arrangement 32, fluid passage support 33, fluid nozzle 34, fluid gathering ring 35, fluid passage closure 36, rotor 40, rotatable casing 50, low ring gear brake 66, reverse ring gear brake 69, drive shaft lock 76, manual passage selector 80, fluid passage 84, fluid passage 86m, ratio fluid passage selector 90, fluid passage 92, fluid passage 95, gear shift lever 101, starter 104, boden cable 105, vacuum passage 110, vacuum passage 110B, electrical conduit 128, key switch 150, accelerator 160, air to vacuum control rod 162, engine 200, power shaft 210, transmission housing 500, load 501.

FIG. 2 a schematic view showing the manual controls of the transmission comprising electrical conduits, pressure passages, vacuum lines, control rods and devises; air to vacuum passage selector 14, fluid passage 19, drive shaft 62, drive shaft lock 76, shaft rotor 77, drive shaft lock 76, shaft rotor 77, manual fluid passage selector 80, rotor 82A, control arm 82B, fluid passage 84, fluid passage 86, fluid passage 89, shifting lever 101, steering column 102, shifting lever arm 103, electrical switch 104, boden cable 105, boden cable 106, vacuum passage 110, battery 125, electrical conduit 126, electrical conduit 127, electrical conduit 128, starter switch 130, ground 131, key switch 150, accelerator control rod 161, air to vacuum control rod 162, engine 200, fly wheel 201, power shaft 210, transmission housing 500.

FIG. 3 Four interior views of manual actuated fluid passage selector in housing 80 with top of housing 80, pivotal shaft 82A and arm 82B removed showing rotor 82 in four positions, A, B, C, D encircled by fluid passage 81, 81A, 81B, 81C which are provided with fluid pressure passage 19 and actuator fluid passage 84, 86, to components and exhaust passage 89, each approximately 90 degrees apart with passages connecting valve 83, 85, 87, 88, each 45 degrees from each passage.

FIG. 3-A shows rotor 82 in an inactive position when the shifting lever is in a parked position allowing all valves to be closed between the circular type fluid passages.

FIG. 3-B shows the rotor 82 active in opening valve 85 between circular type passages 19 and 86, which supply regulated pressure fluids to the reverse ring gear brake 69 as valve 87 allows passage 84 as a fluid passage to return the fluids from ratio fluid passage selector 90 to the unrestricted passage 89 extending into the transmission housing 500;

FIG. 3-C shows rotor 82 in inactive postion with all valves closed when the shifting lever 101 is in neutral position.

FIG. 3-D shows rotor 82 in an active position openign valve 83 between circular type passage 19 and 84 which supplies regulated fluid pressure to the ratio passage selector 90 as valve 88 allows fluids from ring gear brake 69 to return through passage 84 to the unrestricted fluid passage 89 into the transmission housing 500.

FIG. 4A is a cutaway view of the front end of casing 50, disclosing fluid collector ring 35, shield 35A, fluid passage closure 36, rotor 40, vanes 41, blades 42, casing 50, cavity 51, fluid inlet end of cavity 51A, fluid outlet end of cavity 51B, fluid inlet port 52, fluid outlet passage 53, circular donut type fluid orifice 54, input power shaft 210, passage closure 36, exhaust passage 53, fluid passage 53A, fluid passage 53A, cylinder 36A, piston 36B, connecting rod 36C, connecting rod 36C, connector pin 36D, spring 36E, inner ring 36F, outer ring 36G, fluid passage 36M.

FIG. 4 shows the inside of passage closure 36, spring 36E, securing ring 36F, outside securing ring 36G, o-ring 36J, o-ring 36K, o-ring retainer 36L, fluid passage 36M, securing ring 36F, outside securing ring 36G, o-ring cavity 36J, o-ring 36K, o-ring retainer 36L, fluid opening through passage closure 36M.

FIG. 4B shows a cutaway view of the rear end of casing 50, clutch cylinder 56, piston 57, bias spring 58, clutch splines 59, clutch splined drive plates 60, clutch facing 60A, clutch splined end plate 60B, lock ring 60E, clutch driven plates 61, sun gear 63 fluid passage 95.

FIG. 5 is a split view of a manual air or vacuum passage selector comprised of housing 14, inlet vacuum passage 110A, outlet passage 110B, vacuum chamber 14A, bore 14B, spring 14C, valve 14D, valve 14E, air passage 14F, connector rod 14H, pivot 14I, spring housing 14L.

FIG. 6 is a split view of a fluid pressure inducer comprised of a housing 16, inlet pressure passage 17, fluid chamber 16A, valve seat 16B, valve 16D, diaphragm 16C, spring 16E, air chamber 16H, fluid outlet 17.

FIG. 7 shows a split view of fluid pressure regulating device in housing 18, disclosing fluid pressure passage 17, chamber 18A, valve seat 18B, chamber 18C, valve 18D, diaphragm 18E, chamber 18F, spring 18G, air vent 18H, outlet passage 19.

FIG. 8 shows a split view of a vacuum actuated fluid passage selector in housing 20, disclosing inlet fluid pressure passage 21, cylinder 20A, piston 20B, spring 20C, valve 20D, bore 20E, exhaust passage 20F, o-ring 20G, outlet fluid passage 23, and vacuum passage 110B.

FIG. 9A cutoff end view of fluid closure 36, inside securing ring 36F, outside securing ring 36G, ball bearing 36H.

FIG. 9B showing an outside face view of fluid passage closure 36, cylinder 36A, piston 36B, piston 36C, piston rod securing pin 36D inside securing ring 36F, outside securing ring 36G, fluid passages 36M.

FIG. 9C shows inside view of portion of the fluid passage closure 36C, inside securing ring 36F, outside securing ring 36G, o-ring cavity 36J, o-ring 36K, o-ring retainer 36L FIG. 10 shows a split view of a forward ratio fluid passage selector 90, fluid passage 8, housing 90, bores 91, 91B, 91D and valve 91A and 91C, fluid passage 92, fluid exhaust passage 93, fluid exhaust passage 94 fluid passage 95, vacuum cylinder 109, vacuum passage 110, piston 111, spring 112, valve rod 113, pressure fluid cylinder 130, piston 131, exhaust fluid passage 132, enlarged cylinder 91, tubular washer arrangement 134, spring 135, ball on shaft restrictor 137, rerestrictive spring arrangement 138, o-ring 139, cylinder transmission vent 140, vent 141, fluid passage 8.

Figures 2, 11:
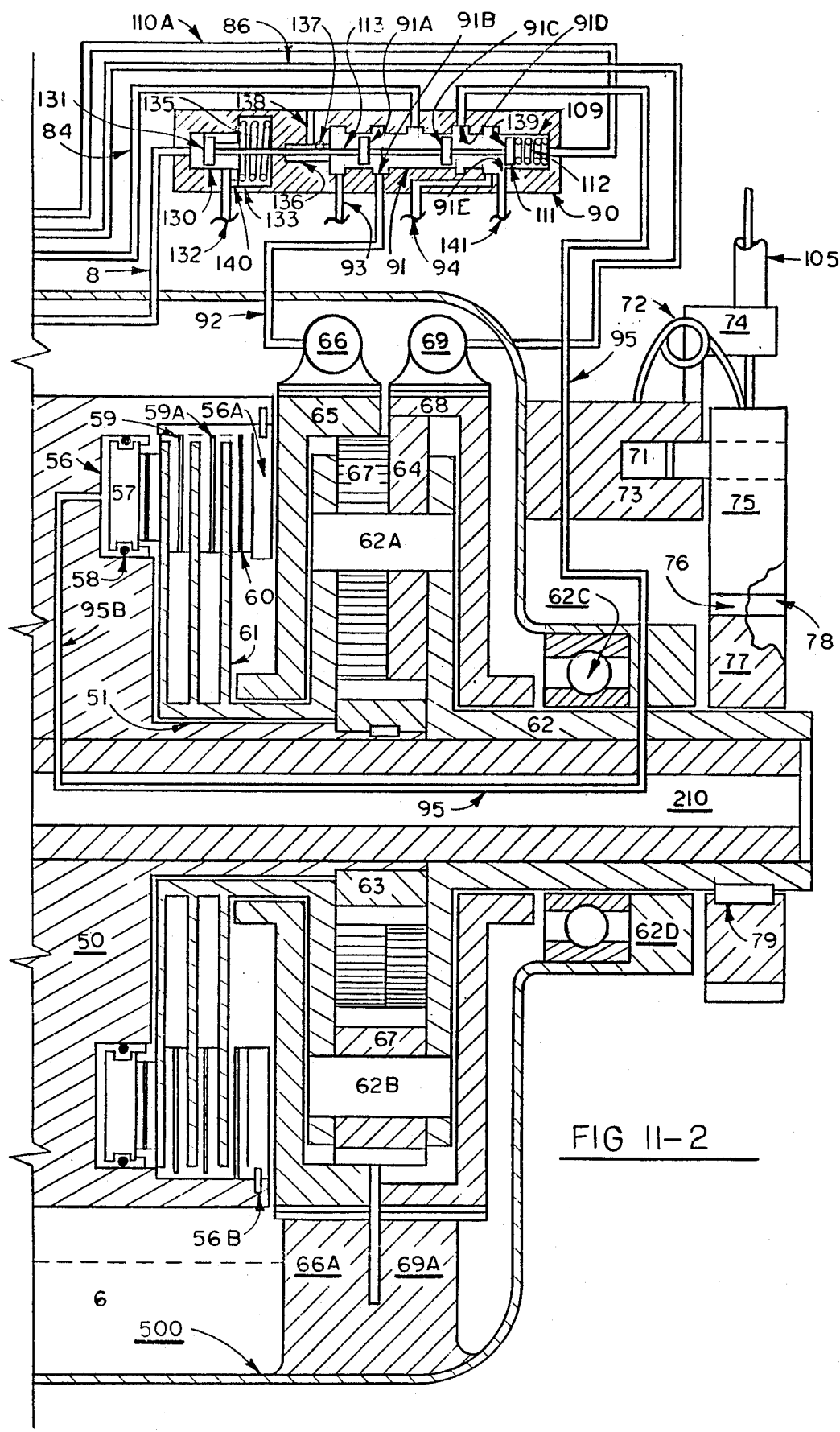

FIG. 11 shows a split view of the internal working portions of the transmission and split views of the components suitable connected to the transmission, fluid reservoir 6, fluid passages 23, 25, donut type cylinder 26 groove 26A donut type piston 27, o-ring seal 27B, ball-groove 27B, ball 28, thrust bearing 29, donut type valve 30, fluid passsge 31, auxiliary pump 3, fluid passage 31C radiator temperature control 32, fluid passage 32A passage support 33, fluid pressure nozzle 34, fluid collector ring 35, inlet passage closure bolt-on housing 36, cylinder 36A, piston 36B, shaft 36C, spring 36D, rings 36E, bearings 36F, rotor 40, rotor vanes 41, rotor 42 casing 50, cavities 51, fluid inlet port 52, fluid outlet passage 53, donut type fluid orifice 54, clutch cylinder 56, clutch drive plate secured to end of clutch 56A, locking ring 56B, clutch piaton 57, piston bias spring 58, clutch housing splines 59, clutch splined drive plates 60, clutch facing 60A, clutch driven plates 61, planetary rotatable drive 62, planetary support bearing 62C, sun gear 63, planetary low gear 64, counter gear 64A, low ring gear 65, low brake band actuating assembly 66, brake band support 66A, reverse planetary gear 67, reverse ring gear 68, reverse brake band actuating assembly 69, brake support 69A, parking brake arm support 70, locking ring 71, spring 72, pivotal shaft 73, boden cable support 74, locking arm 75, locking lug 76, rotor 77, lug 78, woodruf key 79, manual fluid passage selector cover 80, selector rotor connector 82A, rotor arm 82B to connect to boden cable 106, pressure passsges 95, 95A, 95B, transmission drain plug 300, fluid level rod 315, transmission housing 500.

FIG. 1 A transmission housing 500 encompassing and supporting engine's input power shaft 210, is used for driving multiple stationary casing auxiliary pumping systems, 1, 2, 3, and rotatable casing fluid pump 50 with a fluid restrictive valve 30 actuated by vacuum to manipulate fluid pressure mechanism and manual valve 14 to provide vacuum to bias fluids propelled from rotatable pump 50 to apply torque in a silken-smooth manner to planetary drive 62 which can apply rotation in either direction or change of ratio by band restrictions of ring gear.

Power shaft 210 is supported within the front end of transmission housing 500 by bearing 9 and supported in the rear end by journaling rotatable within planetary drive 62, which is rotatable in bearing 62C in the rear end of transmission housing 500.

The auxiliary PUMP 1 having two inlet fluid passages, one extending into the fluid filter 6 in the bottom of the transmission housing 500, the other inlet connects to inlet fluid passage 15A. This fluid pumping arrangement 1 also has two outlets, one a metered outlet 7, allowing all the fluid pumped by the engine up to a designated volume to be by-passed into inlet passage 15A to be recirculated through the pumping system. This will provide a governing effect as the engine speed increases, the volume of fluid pumped is increased, causing excess flow of fluid and pressure to build in fluid passage 8 which extends to ratio fluid passage selector 90, FIG. 10. This becomes the forces to aid vacuum in ratio selection effected by the speed of the engine.

Auxiliary pump 2 which has an inlet passage 15 extending from fluid filter 6 in bottom of transmission 500 and an outlet passage 17 with a fluid pressure inducer 16 FIG. 6 to increase the fluid pressure above the fluid pressure required to actuate all components. Fluid pressure regulator 18 FIG. 9 provides a constant selected lower fluid pressure to passage 19, which provides fluid pressure to the manual fluid passage selector 80 FIG. 3 supplying fluids at a suitable and safe operating pressure level to prevent damage of ring brakes 66 and 69 FIG. 11 and ratio fluid passage selector 90 FIG. 10. The higher pressure fluids are extended by passage 21 to the fluid passage selector 20 and the high pressure fluid passage 25 extends into the rotatable casing 50 FIG. 11 outlet passage 53.

Auxiliary pump 3 is provided with inlet passage 31 extending into the fluid filter 6, in the bottom of transmission housing 500, with an outlet passage 31 extending through the bottom of the vehicle radiator 32 for cooling of the fluids then carried back to passage support 33 for holding outlet nozzle 34, FIG. 1, 11. The rotatable casing pump 50 is provided with these fluids which are biased to induce a fluid connection from the engine 200 FIG. 1, 2, to the load 501.

FIG. 2 shows the manual management system which controls the fueling for the engine 200 powering of fluid impelling, which becomes biased to provide pressure of impelled fluids to torque the load. This is accomplished by manual actuation in three steps: comprised of (1), hand turning key switch 150 FIG. 2 with a combination of ignition and starting positions and (2) hand positioning of a shifting lever 101 to provide the selections: reverse, neutral, forward or parking, (3) and the foot accelerator pedal 160 to provide vacuum and fuel to the engine 200 for acceleration and the connecting rod 162 to actuate on air-vacuum passage selector 14 FIG. 5 to close the air passage 14F and open vacuum passage 110 from the engine 200 FIG. 1 which vacuum pressure is related to the force of the engine and the load it is required to negotiate. This vacuum pressure of engine 200 effects the mode in which the flexible connection performs the functions of motivating the vehicle.

Manual lever in Park position. Turn key in switch 150 FIG. 2 starts engine, leaving the vehicle secured from movement as pivotal lock 27 FIG. 11 holds serated rotor 77 rigidly secured to the driving planetary shaft 62. This secures the vehicle from movement during a period of engine 200 FIG. 1 warming before connecting the engine 200 and the load 501. Three separate effects become apparent:

The first effect: As the shifting lever 101 is moved, a position downward to reverse, arm 103 releases electrical switch 104, discontinuing the providing an electrical connection to the starter switch 24 to prevent starter operation while vehicle is in gear.

The second effect: As the shifting lever is moved down one position, arm 103 actuates boden cable 105 to release a pivotal lock 75 from serated rotor 77, which is secured to the driving planetary shaft 62. This allows the vehicle drive shaft to be rotatable.

The third effect: As the shifting lever 101 (FIG. 2) is moved down one position, arm 104, also affixed to boden cable 106, extends and connects to arm 82B, further extending to a rotor 82 (FIG. 3B) open valve 85 (FIG. 3B), allowing pressure fluid from circular passage 19 (FIG. 3A) to pass into circular passage, 81 (FIG. 3D) where an outlet fluid passage 86 (FIG. 11) extends to a ring gear braking arrangement 69 (FIG. 11) to stop rotating motion of the ring gear 68, which is meshed with gear 67, rotatable on shaft 62A in the planetary system 62 and meshing with sun gear 63 carried and secured to an extension of the rotatable casing 50, which will cause pinion gear 67 to orbit the ring gear in reverse direction to the rotation of sun gear 63 and when the sun gear is rotated. (At this point the engine 200 (FIG. 1) is not forcefully connected to the load through the impelling rotors 40, blades 42, (FIG. 11) in the cavities 51 of casing 50. The fluids are being passed through free flowing since no restriction of biasing is taking place by valve 30. This will have no drive effect on the engine 200 (FIG. 1) which is the same as the fluid drive has at idling speed. Thus the manual accelerator 160. (FIG. 2) becomes the means to institute the supplying of vacuum for biasing to connect or disconnect the engine 200 (FIG. 1) from the planetary drive 62 (FIG. 11) as the fluid drive of the conventional vehicle transmission) This allows the manual foot accelerator pedal to be useful in connecting and disconnecting the loads which is essential in making short stops and in changing directions.

The spring 14C (FIG. 1, 5) biasing in the air or vacuum passage selector 14 provides atmospheric air pressure to the fluid passage selector 20 (FIG. 8, 11). Spring 20C bias provides an unrestricted fluid passage 20F from cylinder 26 into the transmission housing 500.

When the foot feed 160 (FIG. 2) is manually depressed to supply fuel to the engine 200 above idling speed, the atmospheric air passage 14F (FIG. 1, 5), then closes, and the vacuum passage 110B (FIG. 2, 11) from the engine 200 is opened, to supply vacuum pressure to the fluid passage selector 20 (FIG. 8) thus overcoming spring 20C bias. (This spring 20C should be calibrated to the forces of the engine as manifold pressure versus the load. This said spring 20C tension provides the that forces of the engine 200 be applied to the load 501 (FIG. ) to open a fluid passage 23 to a biasing apparatus comprised of a donut type cylinder 26 (FIG. 11) affixed and sealed to the encased power shaft 210 fitted with a donut type piston 27 fitted for sealing and sliding in the cylinder 26 and on the encased power shaft 210 and is provided with a ball- 28 groove arrangement to insure the rotation of the cylinder 26 and the piston 27 in unison. Piston 27 has a smaller extended portion 27C provided with a bearing 29 fitted with an encasement forming a valve 30 capable of closing a donut type fluid outlet orifice 54 of the casing 50.

The valve 30 begins the biasing process to connect the engine 200 to the load 501. This puts the planetary gear system 62 in motion in reverse, of which the fuel supplied effects the acceleration of the engine vacuum pressure, and at some point, the biasing of the load causes the vacuum pressure to drop, allowing the spring 20C biasing to close the inlet pressure port 20D1 through passage 23 to cylinder 26 and hold the biasing force at a given vacuum pressure level. Should the load or fueling increase, the engine would further decrease, and the spring 20C bias would overcome the lower vacuum pressure. This would provide an outlet passage 23 through the fluid passage selector 20 from the cylinder 26 inside transmission housing, releasing some of the fluid pressure by 20F into the transmission housing and allowing the biasing vehicle 30 to retract and reduce the biasing until acceleration of the engine again allows an increase in vacuum pressure. This procedure will start the increase of fluid pressure to the biasing vehicle 30 over again. This combines the vacuum pressure and the spring 20C bias in the fluid passage selector 20 as a delegating arrangement to change the biasing, to provide equalization of the engine to the load. This places the planetary in motion by putting the planetary drive into orbit around the sun gear in the opposite direction, moving the vehicle in reverse, which will continue in reverse until the accelerator pedal 160 (FIG. 1) is released, relinquishing the rotatable casing 50's flexible connection or moving the manual shifting lever 101 (FIG. 2) to a new position, releasing the brake 69 FIG. 11. This will allow the ring gear 68 to rotate and stop the planetary gear. 67 from orbiting the sun gear, Reconnecting the load by moving the manual shifting lever 101 (FIG. 2) down to the third position will change the direction to forward, as regulated fluid pressures are extended through valve 83 (FIGS. 3D, 11) into passage 84 of manual selector 80 to ratio passage selector 90 (FIGS. 10 and 11), where valve 91A (FIGS. 10 and 11) forms a closure in bore 91 (FIGS. 10 and 11) between fluid passage 92 and fluid exhaust passage 93 into transmission housing 500, and valve 91C in port 91B, allowing passage 95 a path through bore 91E to exhaust passage 94 into the transmission housing 500 as a formed closed passage for fluid pressure from passage 84 through bore 91 into pressure passage 92, extending pressure fluid to the brake actuator 66, which holds ring gear 65 from rotation which is in mesh with counter gears 64 on counter shaft 62B, secured into the rotatable planet driving arrangement gear 64, which is also on a planetary shaft 62A, however, on a different radius, which provides meshing with the sun gear 63, which is secured to a small tublar extension 51 of casing 50, which is carried rotatably by the power shaft 210.

The function above described places the vehicle in low gear and will remain in low until the increase of fueling brings the engine power up. The speed of the engine and the auxiliary pump 1, (FIGS. 1, 11), which is provided with fluid metering passage 7 which speed of engine or rotation produces a volume of fluid which overloads the metering passage 7, and builds fluid pressure in fluid passage 8 (FIGS. 1, 11), extended to cylinder 130 in ratio passage selector 90 to apply fluid pressure against the piston 131, in cylinder 130 which aids increased vacuum in cylinder 109 to induce piston 111 to overcome the biasing springs 112 and 135 to a point where the pistons can move the valve rod 113, which has an enlarged ball or cylinder 136 portion provided with a small restrictor 137 ball and spring (in passage 138) in a spring bias assembly 138 into a new right hand position, which the new valve 91A positions opening bore 91, allowing a low brake acuator 66 to exhaust through passage 92 and passage 93 into transmission housing 500. Valve 91A is in a new position to form a closure in port 91B and valve 91C closes 91D from exhaust passage 94, while providing in port 91B a path connecting fluid passage 84 into fluid passage 95, through power shaft 210 and through passage 95B in casing 50 extending through the periphery of the casing 50 into a donut type cylinder 56 provided with regulated fluid pressure to actuate a donut type fitted piston 57 to overcome spring 58 bias and compress the splined drive plates 59 slideable in ways prepared in the outer end of casing 50's hub 50A, provided with friction-facing 60 with driven plates 61 in a formed enclosure by the installing of a splined drive plate 59A with a lock ring 56B in the outer end of the hub, causing driven plate 61 to rotate with the casing 50 as the driven plates 61 are secured to the planetary rotatable drive 62, which propels the vehicle into high ratio.

The source of power is effected as to the burdening of the fluid to the load 501 of which it is required to rotate. Therefore, as the fueling burdening increases the load 501 on the engine 200 (FIG. 2), the prime mover, the vacuum in the manifold connection 4 (FIG. 2) decreases which is reflected in vacuum passage 110B and cylinder 20A (FIG. 8) on piston 20B in the fluid passage selector 20, and at some point the spring 20C will overcome the reduced vacuum pressure applied to piston 20B and valve 20D1, which will close down bore 20E inlet high pressure fluid passage 21 from bore 20E fluid passage from cylinder 26 to burdening biasing valve 30 and open passage 21 into communication with exhaust passage 20F and allow cylinder 26 to exhaust some fluid to relax the burden. If the load still increases to a point (as in going up a hill or such), where high gear ratio is not suitable, engine 200 (FIGS. 1, 2) the prime mover, becomes overloaded and loses power and speed, reducing the auxiliary pump 1 output and lowering the pressure in cylinder 130 and the vacuum in line 110B is decreased and at some point the spring bias of springs 135 and 112 will overcome fluid pressure in piston 131 and spring-and-ball 137 bias and vacuum on piston 111 which moves valve shaft 113 back left into low gear as fluid passage selector 90 is repositioned as valve 91A forms closure in bore between fluid passage 92 and fluid exhaust passage 93 extending into the transmission housing 500 and valve 91C in bore 91 allows fluid through passage 95 a path through port bore 91D to exhaust passage 96 extending into the transmission 500, which formed a path for regulated fluids from passage 84 through port 91B to actuate brake 66, thus returning it to low gear as has been fully described above.

The cavity 51 inlet fluid passage closure 36 (FIG. 11) is held in sliding and sealing position by peripheral fixtures 36B-36F (FIG. 9) that can be suitably attached or bolted to the front end of casing 50 (FIG. 4A) by capscrews to hold prepared opener and closer rings 36 on ball bearings 36H (FIG. 9A) for close tolerance fitting and allows sliding and sealing, actuated by spring 36D (FIG. 9B) bias to close the inlet passages 51B (FIGS. 4, 11) or can be opened by fluid pressure in outlet passage 53 (FIG. 4A) of casing 50 to supply fluid pressures to slide the passage closure 36 away from the inlet passage 51B. Each cavity has an inlet (51B) and an outlet (52).

A fluid passage in a capscrew 36D extends from within the outlet passage 53 in through the pivotal securing arrangement 36E (FIG. 9B) of the connecting rod 36C, to and through the connecting rod 36C extending into cylinder 36A to a secured fitted piston 36B which is prepared for sealing and sliding. The fluid passage closure 36 is a means to open or close inlet passages 51B which can change to an exhaust passage by advanced rotation of the casing 50 over the rotor 40 (FIGS. 11 and 4A, which will change the direction of blades 42 movement in wiping through cavities 51.

Fluid pressure in outlet passage 53 is also provided with fluids from engine driven pump 2 (FIG. 1) which pressure is increased by pressure inducer 16 FIGS. 6, 11) of which the fluids are of higher pressure than the pressure of the fluid being retained by biased outlet 30 (FIG. 11) of fluids.

The fluids which are supplied by pump 3 (FIG. 1) into the gathering ring 35 (FIG. 11) are induced into inlet passage 51B (FIGS. 1, 2) and the fluids will be wiped through the cavities 51 by blades 42 powered by the engine 200 FIGS. 1, 2. As the engine power, vacuum and biasing are increased the biasing retains more of the fluid in outlet passage 53 (FIG. 11). At some point the fluid induced by pump 2 (FIG. 1) will equal the exhausted bias fluids. At that point no more fluids will pass through the inlet passages nor will be wiped through the cavities 51 by blades 42 as the rotor 40 and the casing 50 will be rotating in unison. If the engine forces are capable of gaining on the load, the vacuum will increase, as will the biasing, and and then the pressure of the excess pressure fluid from pump 2 will start building pressure in the outlet passage 53, which will cause cavities 51 to expand ahead of the rotor blade 42, moving the blades in a reverse movement within the cavities and the inlet passages 51B will become the outlet for the fluid, and the higher the biasing becomes, the greater the casing 50 will be shoved ahead of the rotor 40 until all the fluids of the pump 2 input are added to the casing 50 overdriving of the engine 200 rotation of rotor 40, providing overdrive to the load 501. And, when the overdrive has peaked, pump 2 will have supplied the added fluid pressure to proportionate effect of overdrive, however, if for any reason, like going down hill, where the load would cause an increase further in overdriving, the pressure then would cease, as the load then would try to increase the fluid pumped from the outlet passage 53 out through the cavities and out the inlet passage as it would try to overrun the rotor and the engine. However, this would not occur as the bias spring 36D would start closing inlet passages 51B and would build a pressure on the blades in the inlet end of the cavities 51 and prevent rotation to exceed the overdrive. However, should the foot feed be released, the biasing would come to an end as the vacuum supply would be closed off by passage selector 14, (FIG. 5) from fluid passage selector 20 (FIG. 8) which the spring 20C bias would close pressure passage 17 and open the fluid outlet passage 21 from the cylinder 26 to the unrestricted passage 20F into the transmission housing 500 and release valve 30 biasing. This would cause all pressure fluids to be released from outlet passage 53. This would allow the spring 36D bias of passage closure 36 to close the inlet passage 51B pressure, stopping the blade 42 from reverse movement in the cavities 51, bringing the rotation of casing 50 and rotor 40 together, allowing the engine to become a braking medium.

What is claimed is:

1. A ratio change transmission for variable speed driving connection between an engine and its load, directly through, or via low and reverse gears of a planetary gear system, comprising in combination:
    a housing; a driving shaft penetrating the housing and powered from the engine;
    a fluid variable torque pump having casing means and rotor means therein;
    said rotor means affixed to said shaft for rotation therewith and said casing means rotatably carried by said shaft for rotation independently of said rotor means;
    a fluid flow system including means for supplying fluid to the pump for pumping by the rotor means out of said casing means into said fluid flow system;
    means restricting said pumped fluid flow to increase the fluid pressure in said casing means and impart variable rotation and torque to the casing means with said torque being proportional to the amount of restricting;
    means establishing driving connections from the casing means to the load directly or via said planetary gear system supported by said shaft;
    the means restricting comprises impeding means extendible into and retractible from said pumped fluid flow and,
    means responsive to engine vacuum to control positioning of said impeding means.

2. A ratio change transmission for driving connection between an engine and its load, directly through or via low and reverse gears of a planetary gear system, comprising in combination:

a housing; a driving shaft penetrating the housing and powered from the engine;

a fluid variable torque pump having casing means and rotor means therein;

said rotor means affixed to said shaft for rotation therewith and said casing means rotatably carried by said shaft;

a fluid flow system including means for supplying fluid to the pump for pumping by the rotor means out of said casing means into said fluid flow system;

means restricting said pumped fluid flow to increase the fluid pressure in said casing means and impart rotation and torque to the casing means with said torque being proportional to the amount of restricting;

means establishing driving connections from the casing means to the load directly or via said planetary gear system supported by said shaft;

the means restricting comprises impeding means extendible into and retractible from said pumped fluid flow;

means responsive to engine vacuum to control positioning of said impeding means;

said engine comprises an accelerator;

first valve means responsive to said accelerator;

a source of high pressure fluids;

said means responsive to engine vacuum comprises second valve means to control said positioning;

a connection from said accelerator to said first valve means to open the valve to engine vacuum upon initial movement of the accelerator and cause said second valve means to supply high pressure fluids from said source to said impeding means to increase torque applied to the load.

3. The transmission of claim 2, wherein:

said gears are selectible by a gear shift means comprising a manual actuable gear shift valve for selecting forward or reverse gear fluid paths;

a connection from said gear shift means to said valve for selection; and, means in said fluid paths for operating actuators for the low and reverse gear of the planetary gear system.

4. The transmission of claim 3, wherein:

said casing means comprises a hollow casing having cavities along its internal periphery;

said rotor means comprises a plurality of extendible, flexible blades disposed in radial directions relative to said shaft for wiping fluid from said cavities in the direction of said impeding means when the blades travel faster than the casing to build torque transmitted from the casing to the load;

means for introducing high pressure fluids into the casing from the means for supplying high pressure fluids, whereby, as the impeding means increase the amount of restricting to a predetermined amount, the high pressure fluids are forced to enter the rotor from the casing to drive the cavities faster than the blades causing overdrive when the engine force is greater than required to maintain the load.

5. The transmission of claim 2, wherein:

said casing comprises an internal gathering ring in communication with the rotor for receiving the fluid for pumping, said gathering ring retaining the fluid against centrifugal force for removing air bubbles from the fluid supplied to the torque pump.

6. The transmission of claim 4, wherein:

said means for supplying high pressure fluids comprises a pump having a greater output pressure than said torque pump connected in communication with said casing in opposition to the pumped output fluid flow when it is restricted to increase the amount of fluids in said cavities of said casing, thereby causing said casing to increase its speed of rotation to provide overdrive for the load.

7. The transmission of claim 6, wherein:

said fluid system includes a ratio switching valve;

a further fluid pump driven by said shaft and having fluid pressure directly proportional to engine speed; a fluid connection from said further pump to said ratio switching valve to aid engine vacuum in switching driving connections from the casing means to the load directly or via said planetary gear system.

8. The transmission of claim 7, wherein:

the means establishing a driving connection from the casing to the planetary gear system comprises a clutch housing integral with the casing, having drive plates slidable on splines;

driven clutch plates carried by the planetary gear system;

a piston in a cylinder carried by the casing to overcome a biasing spring to bear against the plates when urged by regulated pressure fluid flow from manual selected passages.

9. A method of using a fluid pump having a rotor affixed to an engine shaft for rotation therewith and a casing carried by the shaft independent of the rotor and rotatable about the shaft to transmit variable speed engine power to a planetary gear system for a load comprising the steps of:

pumping fluid to the rotor for pumping, in turn, using shaft rotation, the fluid along a pathway exiting the rotor and extending through a portion of the casing and exiting said casing, variably restricting said fluid flow exiting the casing under control of engine vacuum to cause the casing to rotate at variable speeds in accordance with variations in engine vacuum; and connecting said casing to the gear system for torque transfer to said load in amounts directly proportional to said restricting.

10. A method of transmitting engine power to a load which is capable of an infinite ratio of engine shaft rotation to load rotation, comprising the steps of:

translating shaft rotation to fluid flow along a pathway;

restricting the fluid flow along said pathway in response to engine vacuum to produce variable speed power transmitting rotation; and, driving said load from the power transmitting rotation wherein the amount of power transmitted and load rotation speed is directly proportional to the restriction.

11. A ratio change transmission for driving connection between an engine and its load, directly through, or via low and reverse gears of a planetary gear system, comprising in combination;

a driving shaft powered from the engine;

a fluid variable torque pump having a casing, and a rotor therein;

said rotor affixed to said shaft for rotation therewith and said casing rotatably carried by said shaft;

said casing having fluid cavities and said rotor having blades for wiping fluid through said cavities;

a fluid flow system including means for supplying fluid to the pump for pumping by the rotor blades;

means restricting the pumped fluid flow to increase the fluid pressure in said system and impart rotation to the casing;

means establishing driving connections from the casing to the load via said planetary gear system;

said means restricting comprises impeding means extendible into and retractible from the pumped fluid flow;

means responsive to engine vacuum to control positioning of said impeding means;

said engine includes an accelerator;

means for supplying high pressure fluid; p1 first valve means responsive to said accelerator;

said means responsive to engine vacuum comprises second valve means to control said positioning;

a connection from said accelerator to said first valve means to open the valve to engine vacuum upon initial movement of the accelerator and cause said second valve means to supply high pressure fluids from said means for supplying high pressure fluid to said impeding means to increase torque applied to the load;

said gears are selectible by a gear shift means comprising a manual actuable gear shift valve for selecting forward or reverse gear fluid paths;

a connection from the gear shift means to said gear shift valve for selection;

means in said fluid paths for operating actuators for the low and reverse gears of the planetary gear system;

said restricting means comprising valve means adapted to move into and out of said fluid flow.

said casing includes an internal gathering ring in communication with the rotor for receiving the fluid for pumping;

said gathering ring retaining the fluid against centrifugal force for removing air bubles from the fluid fed to the torque pump;

said cavities in fluid communication with the fluid in the gathering ring and with the restricting means;

said fluid system comprises a pump having a greater output pressure than said torque pump connected in communication with said casing in opposition to the pumped output fluid flow when it is restricted to force expansion between adjacent blades of the rotor and said casing, thereby causing said casing to increase its speed of rotation relative to the rotor to provide overdrive for the load.

12. The transmission of claim 15, wherein:

said fluid system comprises a ratio switching valve;

a further fluid pump driven by said shaft and having fluid pressure directly proportional to engine speed;

a fluid connection from said further pump to said ratio switching valve to aid engine vacuum in switching driving connections from the casing means to the load directly or via said planetary gear system.

13. The transmission of claim 12, wherein:

the means establishing a driving connection from the casing to the planetary gear system comprises a clutch housing integral with the casing, having drive plates slidable on splines;

driven clutch plates carried by the planetary gear system;

a piston in a cylinder carried by the casing to overcome a biasing spring to bear against the plates when urged by regulated pressure fluid flow from manual selected passages.

* * * * *